United States Patent
Leimbach et al.

(10) Patent No.: US 6,314,383 B1
(45) Date of Patent: Nov. 6, 2001

(54) METHOD AND SYSTEM FOR DETERMINING A VEHICLE MASS

(75) Inventors: Klaus-Dieter Leimbach, Moeglingen; Hans Veil, Eberdingen; Stefan Hummel, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/110,810

(22) Filed: Jul. 6, 1998

(30) Foreign Application Priority Data

Jul. 5, 1997 (DE) ............................................. 197 28 867

(51) Int. Cl.$^7$ ..................................................... G01G 11/00
(52) U.S. Cl. ............................................... 702/173; 73/865
(58) Field of Search .............................. 702/173; 701/71, 701/79; 303/167; 177/25.11; 73/146, 865

(56) References Cited

U.S. PATENT DOCUMENTS

| | | | |
|---|---|---|---|
| 4,548,079 | * 10/1985 | Klatt ........................................ | 73/432 |
| 4,656,876 | * 4/1987 | Fremd ..................................... | 73/865 |
| 4,941,365 | * 7/1990 | Reiner et al. .......................... | 73/865 |
| 5,187,977 | * 2/1993 | Koschorek et al. ................... | 73/146 |
| 5,402,345 | * 3/1995 | Kost ........................................ | 701/79 |

FOREIGN PATENT DOCUMENTS

| | | |
|---|---|---|
| 38 43 818 | 5/1990 | (DE) . |
| 42 28 413 | 3/1994 | (DE) . |
| WO 93 18375 | 9/1993 | (WO) . |
| WO93/18375 | 9/1993 | (WO) . |

* cited by examiner

*Primary Examiner*—Patrick Assouad
*Assistant Examiner*—Edward Raymond
(74) *Attorney, Agent, or Firm*—Kenyon & Kenyon

(57) ABSTRACT

A method and a system for ascertaining a mass value representing the vehicle mass of a motor vehicle, particularly of a commercial vehicle, having a drive unit. An acquisition at least of a first and a second acceleration value is provided for this determination. These acceleration values represent the vehicle acceleration at a first and a second point of time. Further, at least one first and one second drive value are acquired. These drive values represent the drive force or the drive torque of the drive unit at the first and the second point of time. At least as a function of the acquired acceleration values and the acquired drive values, at least a first and a second driving-resistance value are then determined. The mass value is ascertained at least as a function of a comparison of the determined first driving-resistance or mass estimated value to the determined second driving-resistance or mass estimated value. A roadway slope is detected using the comparison, whereby an erroneous mass determination caused by the roadway slope is avoided.

14 Claims, 3 Drawing Sheets

METHOD AND SYSTEM FOR DETERMINING A VEHICLE MASS

FIELD OF THE INVENTION

The present invention relates to a method and a system for determining a mass value representing a mass of a vehicle.

BACKGROUND INFORMATION

Systems for the open-loop and closed-loop control, respectively, of the driving dynamics of automobiles are known. The control of the braking system is the priority here. In such systems, the most precise information possible about the vehicle mass is of major significance.

If the motor vehicle is a commercial vehicle having a towing vehicle and a trailer/semi-trailer, an optimal coordination of the braking forces with regard to economic efficiency, safety and driving comfort can be attained if the masses of the towing vehicle and the trailer/semi-trailer are known as accurately as possible. If the mass of the entire truck with trailer is known, then, given the known mass of the towing vehicle, the mass of the trailer/semi-trailer can be determined. Since, however, according to its intended purpose, large differences can occur in the payload of commercial vehicles and thus in the total mass of the vehicle, the total mass and the distribution of the mass between the towing vehicle and the trailer/semi-trailer must continually be redetermined. Thus, the driving stability can be increased by suitably distributing the braking torque on the individual wheel brakes.

German Patent Application No. 42 28 413 describes a determination of the total mass of a vehicle, in which the longitudinal acceleration of the vehicle and the appertaining driving and propulsive forces are measured at two different points of time in brief succession during an acceleration process of the vehicle. The vehicle mass can then be determined as a function of these measured variables. It is assumed here that the driving resistance while determining the mass does not change significantly, for example due to a change in the roadway slope.

An object of the present invention is to determine mass as simply as possible and with greatest possible precision in view of a possibly sloped roadway.

SUMMARY OF THE INVENTION

The present invention relates to a method and a system for determining a mass value of a motor vehicle representing the vehicle mass, particularly of a commercial vehicle, having a drive unit. For this, provision is made for acquisition of at least a first and a second acceleration value. These acceleration values represent the vehicle acceleration at a first and a second point of time. Furthermore, at least a first and a second drive value are detected. These drive values represent the drive force or the drive torque of the drive unit at a first and at a second point of time. At least as a function of the acquired acceleration values and the acquired drive values, at least a first and a second driving resistance or mass estimated value is then determined. According to the present invention, the determination of the mass value occurs at least as a function of a comparison of at least the determined first driving-resistance or mass estimated value with the determined second driving-resistance or mass estimated value.

A roadway slope is detected using the comparison in accordance with the present invention, whereby an erroneous determination of mass due to a roadway slope is avoided without necessitating an additional sensor for determining the mass and/or for determining the roadway slope. The mass can be determined during a single acceleration process, the method according to the present invention being simple to apply. In so doing, the result of the mass estimation achieved according to the present invention is sufficiently precise for a practical use.

In another embodiment of the present invention, the points of time are selected such that the acquired drive values vary from one another in a predeterminable manner. In particular, the difference or differences between the acquired drive values exceed(s) or fall(s) below a predeterminable first threshold value. The background for this embodiment is that a roadway descending gradient or roadway incline is having a particularly significant affect on the acceleration values of the vehicle if highly variable drive values exist.

In addition, or particularly as an alternative to the last cited variation, it can be provided that a signal representing the gear ratio of the vehicle transmission is generated. The points of time at which the acceleration and drive values are acquired can then be selected as a function of the generated signal. In so doing, different transmission ratios exist at these points of time. In this way, it can be ensured in a simple manner that the drive forces, which are drawn upon to determine the driving resistance or mass estimated values, are sufficiently different. The differing drive forces, which are necessary to recognize the slope, are realized in this embodiment by using "gear-speed tracking". This has a basis in that, during the start-up (e.g., drive off), the transmission ratio becomes smaller, and thus smaller forces act on the drive axle as the vehicle speed increases.

For the comparison according to the present invention, it is ascertained whether the determined driving resistance or mass estimated values are within a predeterminable range. In particular, it can be ascertained whether the difference or differences between the determined driving resistance or mass estimated values exceeds or falls below or exceed or fall below a predeterminable second threshold value. In this manner, it can be determined whether the vehicle is currently located on a sloped roadway, because in this case, the driving-resistance or mass estimated values, which were ascertained for different drive values, vary significantly.

To compensate for short-term fluctuations, the determined driving-resistance or mass estimated values are low-pass filtered.

In particular, the mass value is ascertained only if the determined driving-resistance or mass estimated values are within a predeterminable range, thus if there is no or only a slight roadway slope. This ensures the reliable determination of a mass value.

In a further embodiment of the present invention, to ascertain the mass value, at least one of the determined driving-resistance or mass estimated values is also drawn upon, provision being made in particular that the average value from at least two of the determined driving-resistance or mass estimated values is ascertained as the mass value. This increases the quality of the mass value determined according to the present invention.

If a value representing the vehicle speed and/or a value representing the rotational speed of the vehicle wheels is (are) also drawn upon to determine the driving-resistance or mass estimated values, the influences of the aerodynamic drag and/or moments of inertia of the vehicle wheels can be considered in the mass determination according to the present invention.

DETAILED DESCRIPTION

Figure 1:
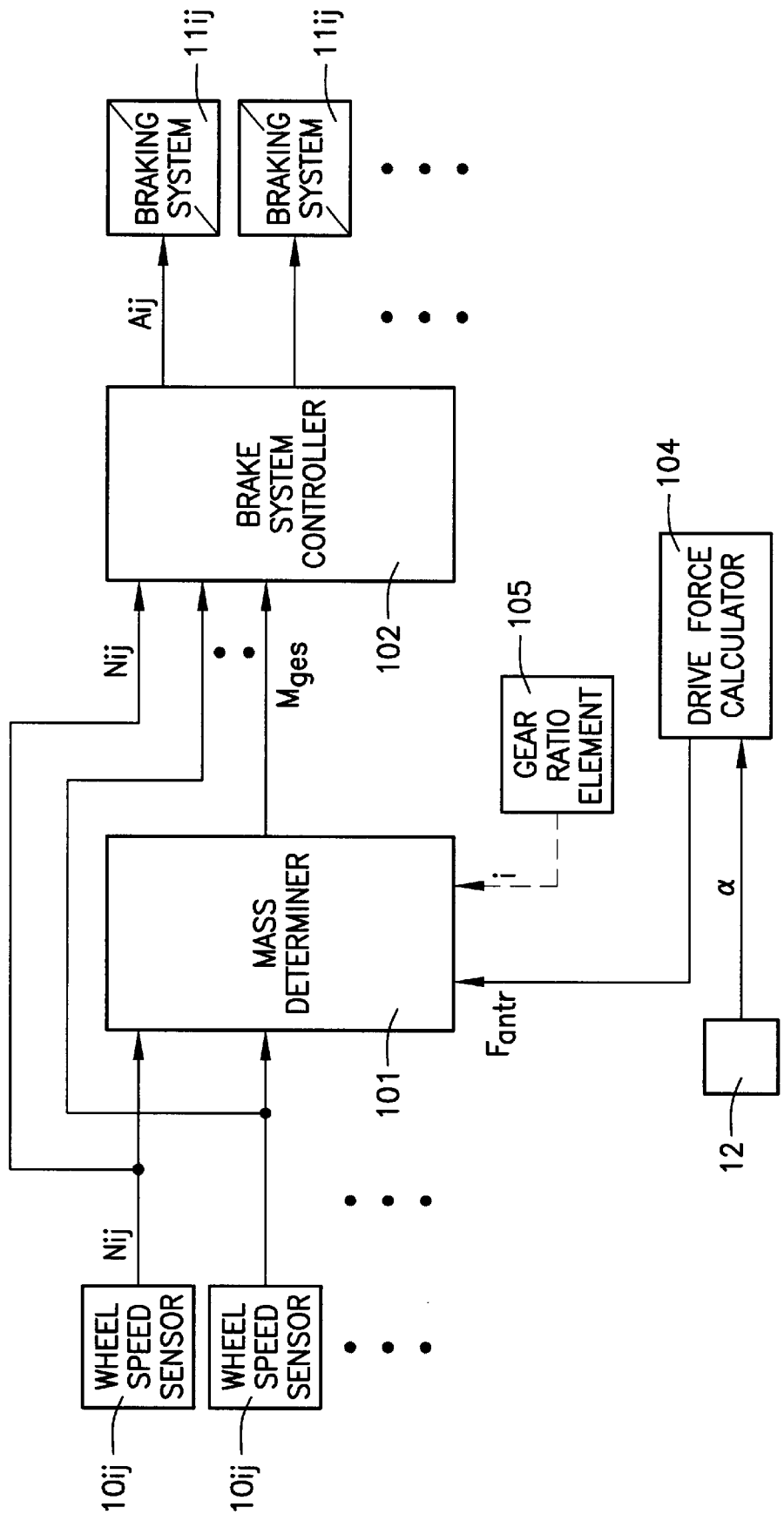
FIG. 1 shows a general block diagram of the present invention.

FIG. 1 illustrates, with blocks 10ij, wheel speed sensors which detect the rotational speeds of the vehicle wheels. Wheel speed signals Nij are supplied to block 101, which determines a mass value $M_{ges}$ representing the total mass of the vehicle, and this value is supplied to block 102. In block 102, braking system 11ij, in particular the individual wheel braking systems, are driven by driving signals Aij as a function of total mass $M_{ges}$, wheel speeds Nij, and possibly as a function of additional signals.

To determine the mass, drive force $F_{antr}$ and the drive torque, respectively, determined in block 104, are also supplied to block 101. A signal I which represents the current gear ratio of the vehicle transmission can optionally be fed to block 101.

Following, mass determination 101 of the vehicle or vehicle combination (towing vehicle plus trailer or semi-trailer) shall be described in greater detail with reference to FIG. 2.

The starting point for determining mass $M_{ges}$ of a vehicle is a force balance or an energy balance in the longitudinal direction of the vehicle movement. Used for that purpose are operational phases in which braking and drive torques acting on the wheels are known.

The determination of mass $M_{ges}$ for a vehicle acceleration $a_{Fhzg}$ is described below. For an acceleration process, the force balance is:

$$M_{ges} * a_{Fhzg} = F_{antr} - F_{Roll} - F_{Luft} - F_{Hang} - F_{Rot} \quad (1)$$

where:
- $a_{Fhzg}$ is the vehicle acceleration,
- $F_{antr}$ is the drive force,
- $F_{Roll}$ is the rolling resistance force,
- $F_{Luft}$ is the aerodynamic-drag force,
- $F_{Hang}$ is the downgrade force, and
- $F_{Rot}$ is the force to accelerate rotating masses (wheels, transmission, . . . )

The current vehicle acceleration $a_{Fhzg} = a_i$ at point of time $t_i$ is formed in block 21 from wheel speeds Nij in a conventional manner using differentiation. The formation of current drive force $F_{antr} = F_{antri}$ at point of time $t_i$ is determined in block 104 (FIG. 1) in general as a function of the data present in the engine control device. This will be described later in this exemplary embodiment.

Aerodynamic-drag force $F_{Luft}$ can be determined using the equation:

$$F_{Luft} = \frac{1}{2} * C_W * \rho_{Luft} * A * V_{Fhzg}^2 \quad (2)$$

plausible approximate values being used for $C_W$ and $\rho_{Luft}$. Vehicle longitudinal speed $V_{Fhzg}$ is also formed from the wheel speeds in block 21 in the known manner.

Value $F_{Rot}$ results from measured wheel speeds $N_{Rad} = Nij$ and the total moment of inertia of all wheels $J_{Rad}$:

$$F_{Rot} = \frac{dN_{Rad}}{dt} * J_{Rad} * \frac{1}{r_{Rad}} \quad (3)$$

For vehicle groupings (towing vehicle with semi-trailer or trailer) having continually changing trailers or semi-trailers, a default value must be assumed for the moment of inertia of the trailer or semi-trailer wheels, respectively.

Rolling resistance $F_{Roll}$ is not considered in this exemplary embodiment.

Given a level street, a value $M_i$, representing the vehicle mass at a point of time $t_i$ can be determined according to the equation:

$$M_i = \frac{F_{antri} - F_{Lufti} - F_{Roti}}{a_i} \quad (4)$$

with values $F_{antri}$, $a_i$, $F_{Roti}$, $F_{Lufti}$ current at point of time $t_i$. This occurs in block 22, initially independently of the roadway slope. In block 24, mass value $M_i$ attained in this way is low-pass filtered to become filtered mass value $M_f$.

If the vehicle is traveling on a roadway sloped in the driving direction (incline or decline), then equation (4)—as well as any other physical balance equation—leads to a considerable estimation error because the driving-resistance is altered significantly by the slope. If a roadway is sloped, mass value $M_i$ determined according to equation (4) includes a significant driving-resistance component.

Therefore, a method is necessary in which the driving-resistance change caused by too great a slope is taken into account, and the calculated mass estimated value is rejected or corrected.

Figure 3:
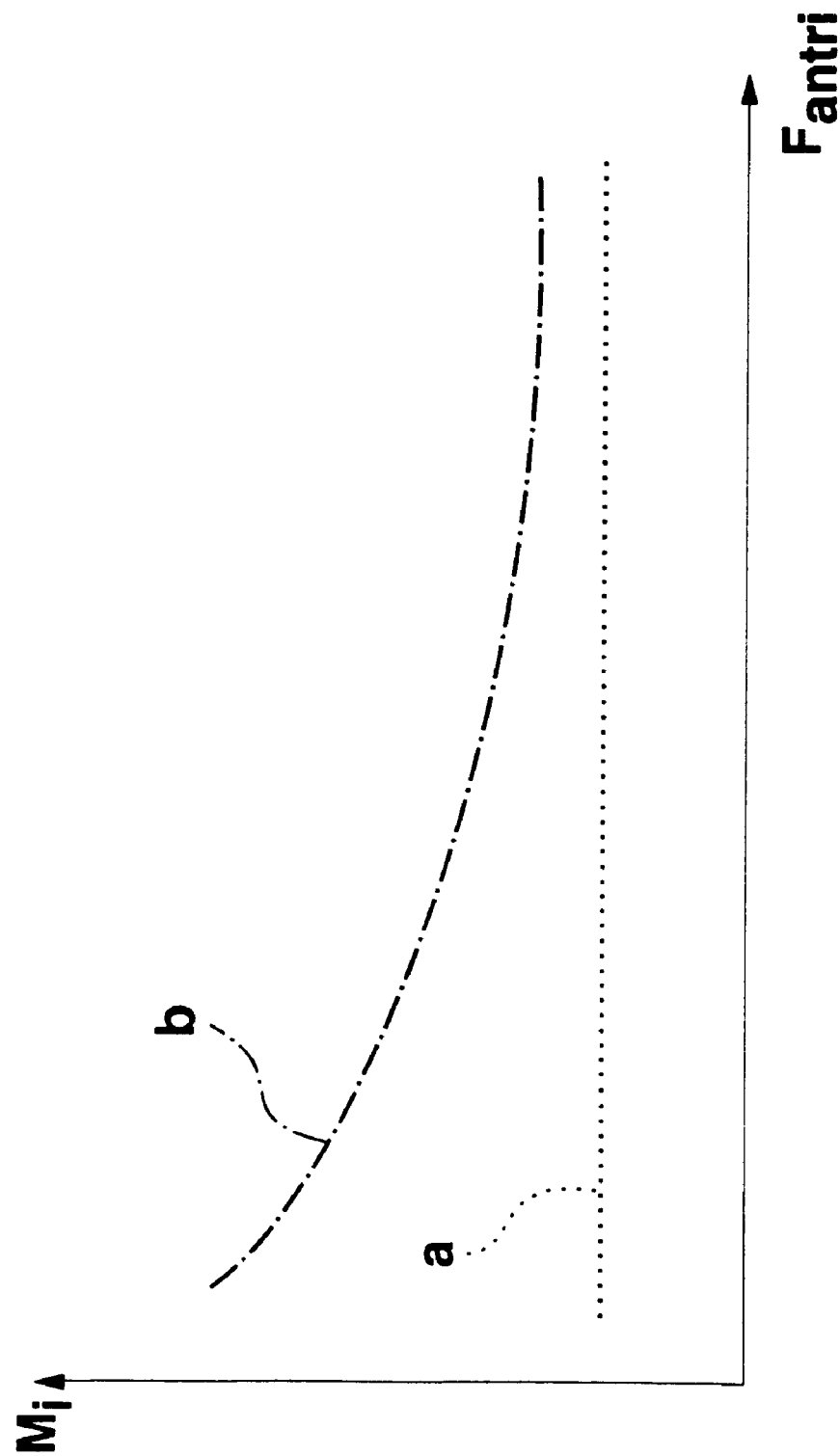
FIG. 3 shows a dependence of a mass determination on a drive force in a case of different roadway slopes.

FIG. 3 shows, in a simplified manner, which mass values $M_i$ are determined in block 22 during a start-up process or during an acceleration process according to equation (4). Accordingly, on a level street (curve a), estimated mass $M_i$ is independent thereof, at which drive force $F_{antri}$ the measurement is taken. On a slope (curve b), however, given different drive forces $F_{antri}$, different masses $M_i$ are also estimated. This is used to determine the slope.

The slope is considered during an acceleration phase by determining the vehicle mass. It is assumed here that initially there is a large transmission ratio during the start-up. As the vehicle speed increases and the transmission ratios decrease, the drive force is thereby reduced on the driven axle.

If there is only little driving resistance during the start-up process (roadway is relatively level), then no or only a small estimated mass difference $\Delta M$ can be determined between phases, in which large and small drive forces $F_{antri}$ act (see curve a in FIG. 3).

During start-up, if there is, however, a greater difference $\Delta M$ determined between the estimated masses in phases of high and lower drive forces $F_{antri}$, then it is assumed that the driving resistances for this start-up process cannot be disregarded. The mass value thus determined must then be corrected or declared as invalid.

Figure 2:
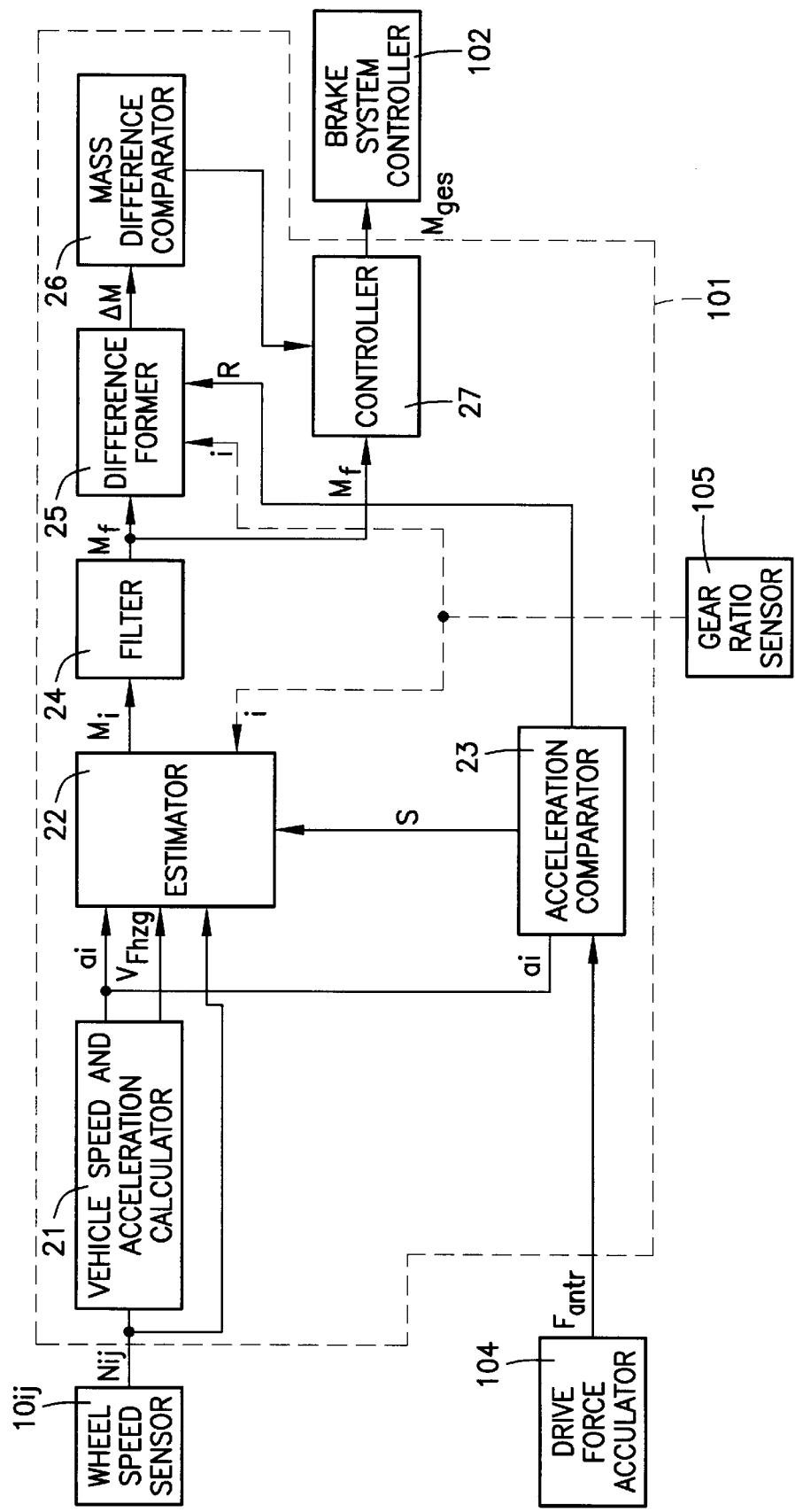
FIG. 2 shows a detailed block diagram of an exemplary embodiment according to the present invention.

As illustrated in FIG. 2, the mass estimated and driving-resistance values $M_i$ are determined in block 22 according to equation (4) only if sufficiently high vehicle acceleration $a_i$ and sufficiently variable drive values $F_{antri}$ during an acceleration action exist. To ensure this, drive values $F_{antri}$ and/or acceleration values $a_i$ are compared to predeterminable thresholds in block 23. Signal S generated in block 23 controls the formation of values $M_i$ in block 22 from these standpoints.

It is to be pointed out here that the function of block 22 is not limited to above equation (4); any other estimation method can be used in block 22.

To determine whether there is a significant roadway slope, the differences $\Delta M$ of mass values $M_i$ that were low-pass filtered in block 24 are formed in block 25. At least one difference $\Delta M$ must be determined from two estimated values $M_f$, and specifically, one estimated value each for large and small drive forces $F_{antri}$, respectively. To ensure that difference formation 25 only forms differences from mass values with sufficiently varying drive values, difference formation 25 is controlled by signal R from block 23.

In block 26, it is determined whether difference value $\Delta M$ determined in this way is within a predeterminable range. This can be implemented such that difference $\Delta M$ is compared to a predeterminable threshold or, depending on the sign of $\Delta M$, to predeterminable thresholds.

If it is determined in block 26 that difference $\Delta M$ is outside of the range (exceeded or fell below the corresponding thresholds), which represents travel in the plane, then block 27 is controlled such that no value $M_{ges}$ is formed for the mass.

If it is determined in block 26 that difference $\Delta M$ is within the range (exceeded or fell below the corresponding thresholds), which represents travel in the plane, then block 27 is controlled such that filtered value $M_f$ is drawn upon as value $M_{ges}$ for the mass. It is also advantageous to derive the average value from a plurality of values $M_f$ as mass value $M_{ges}$.

The determination of drive force $F_{antri}$ in block 104 is discussed below. Drive force $F_{antri}$, which is necessary for estimation, can be calculated as below from the engine torque supplied by the engine control, taking into account the transmission ratio as well as the losses in the engine and transmission:

Engine torque $M_{Mot\_EDC}$ put out by engine control EDC is made up of drive torque $M_{Mot\_Antr}$, engine torque loss $M_{Mot\_Verl}$ and vehicle torque loss $M_{Fhzg\_Verl}$.

$$M_{Mot\_EDC} = M_{Mot\_Antr} + M_{Mot\_Verl} + M_{Fhzg\_Verl} \quad (5)$$

In this context, $M_{Mot\_Antr}$ is the drive torque acting on the transmission input. $M_{Mot\_Verl}$ is the portion that constitutes engine friction losses $M_{Mot\_Reib}$ and engine acceleration losses $M_{Mot\_\theta}$ (including clutch).

$$M_{Mot\_Verl} = M_{Mot\_Reib} + M_{Mot\_\theta} \quad (6)$$

Engine losses $M_{Mot\_Verl}$ can be described by friction losses $M_{Mot\_Reib}$ and losses due to engine acceleration $M_{Mot\_\theta}$. The engine friction losses are a function of engine speed $n_{Mot}$ and water temperature $t_{Wasser}$.

$$M_{Mot\_Reib} = f(n_{Mot}, t_{Wasser}) \quad (7)$$

The losses, which occur due to engine acceleration $(M_{Mot\_\theta})$, result from the engine speed acceleration and moment of inertia $J_{Mot}$, which includes the engine as well as parts of the drive train.

$$M_{Mot\_\theta} = f\left(\frac{dn_{Mot}}{dt}\right) = \frac{d\omega_{Mot}}{dt} * J_{Mot} \quad (8)$$

In view of the above-specified losses, a moment which acts on the drive wheels can then be calculated from the engine drive torque using the gear ratio $i_{ges}$ (transmission, differential ...).

$$M_{Antr} = \frac{M_{Mot\_Antr} * \eta_{Getr}}{i_{ges}} \quad (9)$$

In this context, $\eta_{Getr}$ corresponds to the moment loss in the transmission and differential.

The total gear ratio is determined from the relationship of engine speed $n_{Mot}$ to the wheel speed of driven wheels $n_{Rad}$.

$$i_{ges} = \frac{n_{Mot}}{n_{Rad}} \quad (10)$$

Drive force $F_{antr}$ is determined from the moment that acts on the drive wheels, over wheel radius $r_{Rad}$.

$$F_{antr} = \frac{M_{Antr}}{r_{Rad}} \quad (11)$$

Possible variations of the method described thus far are described in the following embodiments:

Different drive forces $F_{antri}$, which are needed to determine the roadway slope, are realized using a "gear-speed tracking." For this, as illustrated in FIGS. 1 and 2, signal i, which represents the transmission ratio, is supplied to block 22. At this point, driving-resistance or mass estimated values $M_i$ are formed only if different transmission ratios are present.

Likewise, the difference formation can be controlled in block with signal i such that only differences $\Delta M$ are formed from values $M_i$ that were determined for varying transmission ratios.

This has a basis in that during the start-up, the transmission ratio becomes smaller and thus, as the vehicle speed increases, lower forces $F_{antri}$ act on the drive axle. Thus, the described control of blocks 22 and 25 by signal S and R, respectively, can be omitted, for example.

If it is determined during the accelerated phase that other variables are influencing the drive force, the estimation of the mass is interrupted or canceled.

Mass difference $\Delta M$, which is needed to determine the driving-resistances, is yielded from the result of estimator 22. Block 25 can be configured, for example, such that the calculated mass is saved in a sample-and-hold. In so doing, it is sufficient to use only one single estimator for the high and lower force ranges.

The estimation can be improved by considering the operating conditions to which the vehicle is subjected. If, e.g., there is excessive drive slip present during a start-up process, such that a drive slip control must be used, for example, then this start-up process should not be permitted for determining the mass.

Further, it is advantageous to consider an already existing value for the vehicle mass as a starting value. A measured value for the axle load (ALB value) can be drawn upon, for example, as such a starting value. The mass determination according to the invention can be optimized in this way.

In summary, it can be stated that with the determination of the vehicle mass according to the present invention, a parameter estimation method is used for only one parameter. By using only one parameter, this is simplified in contrast to the other known methods and comes the closest to the requirements of an implementation useful in practice. Estimator 22, having one parameter, is regulated or controlled by trigger signals S and I, respectively. For additional requirements, it can be useful to conduct the mass determination using a plurality of estimators.

According to the present invention, vehicle total mass $M_{ges}$ is estimated for high and low values of the drive force. For this, in accordance with the present invention, criteria for evaluating the estimated mass difference and thus a triggering of the estimation method are introduced.

Thus, the present invention has at least the following advantages:

No additional sensor is needed for determining the mass.

The vehicle mass is determined during a single acceleration process.

The algorithm according to the present invention is easy to apply.

The result of the mass estimation achieved according to the present invention is sufficiently precise for practice.

What is claimed is:

1. A method for determining a vehicle mass value representing a vehicle mass of a motor vehicle having a drive unit, the method comprising the steps of:
   (a) determining at least one first acceleration value indicative of a vehicle acceleration at a first time and at least one second acceleration value indicative of the vehicle acceleration at a second time;
   (b) determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;
   (c) determining at least
      a first ascertained value corresponding to at least one of a first driving resistance and a first mass estimated value, and
      a second ascertained value corresponding to at least one of a second driving resistance and a second mass estimated value,
   the first and second ascertained values being determined at least as a function of the at least one first and second acceleration values and the at least one first and second drive values;
   (d) determining a roadway slope as a function of a difference between the first ascertained value and the second ascertained value; and
   (e) comparing the roadway slope to at least one of the first ascertained value and the second ascertained value to determine the vehicle mass value.

2. A method for determining a vehicle mass value representing a vehicle mass of a motor vehicle having a drive unit, the method comprising the steps of:
   (a) determining at least one first acceleration value indicative of a vehicle acceleration at a first time and at least one second acceleration value indicative of the vehicle acceleration at a second time;
   (b) determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;
   (c) determining at least
      a first ascertained value corresponding to at least one of a first driving resistance and a first mass estimated value, and
      a second ascertained value corresponding to at least one of a second driving resistance and a second mass estimated value,
         the first and second ascertained values being determined at least as a function of the at least one first and second acceleration values and the at least one first and second drive values;
   (d) comparing at least the first ascertained value with the second ascertained value to determine the vehicle mass value; and
   (e) performing at least one of the following steps:
      selecting the first and second times to vary one of the first and second drive values from another one of the first and second drive values in a predetermined manner,
         wherein at least one difference between the first and second drive values exceeds or drops below a predetermined threshold value, and
      generating a signal representing a gear ratio of a vehicle transmission,
         wherein the first and second times are selected as a function of the generated signal, and
         wherein varying transmission ratios are present at the first and second times.

3. The method according to claim 1, wherein step (e) includes the substep of:
   (i) determining whether the first and second ascertained values are within a predetermined range.

4. The method according to claim 3, wherein the substep (i) includes determining whether at least one difference between the first and second ascertained values exceeds or drops below a predetermined threshold value.

5. The method according to claim 1, further comprising the step of:
   (f) low-pass filtering the first and second ascertained values.

6. A method for determining a vehicle mass value representing a vehicle mass of a motor vehicle having a drive unit, the method comprising the steps of:
   (a) determining at least one first acceleration value indicative of a vehicle acceleration at a first time and at least one second acceleration value indicative of the vehicle acceleration at a second time;
   (b) determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;
   (c) determining at least
      a first ascertained value corresponding to at least one of a first driving resistance and a first mass estimated value, and
      a second ascertained value corresponding to at least one of a second driving resistance and a second mass estimated value,
   the first and second ascertained values being determined at least as a function of the at least one first and second acceleration values and the at least one first and second drive values; and
   (d) comparing at least the first ascertained value with the second ascertained value to determine the vehicle mass value, the step (d) including the substep of:
      (i) determining whether the first and second ascertained values are within a predetermined range,
   wherein the vehicle mass value is determined only if the first and second ascertained values are within the predetermined range.

7. A method for determining a vehicle mass value representing a vehicle mass of a motor vehicle having a drive unit, the method comprising the steps of:
   (a) determining at least one first acceleration value indicative of a vehicle acceleration at a first time and at least one second acceleration value indicative of the vehicle acceleration at a second time;

(b) determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;

(c) determining at least
  a first ascertained value corresponding to at least one of a first driving resistance and a first mass estimated value, and
  a second ascertained value corresponding to at least one of a second driving resistance and a second mass estimated value,
the first and second ascertained values being determined at least as a function of the at least one first and second acceleration values and the at least one first and second drive values;

(d) comparing at least the first ascertained value with the second ascertained value to determine the vehicle mass value, wherein the vehicle mass value is determined as a function of at least one of the first and second ascertained values; and (e) determining an average value as a function of the first and second ascertained values, the average value being the vehicle mass value.

8. A method for determining a vehicle mass value representing a vehicle mass of a motor vehicle having a drive unit, the method comprising the steps of:

(a) determining at least one first acceleration value indicative of a vehicle acceleration at a first time and at least one second acceleration value indicative of the vehicle acceleration at a second time;

(b) determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;

(c) determining at least
  a first ascertained value corresponding to at least one of a first driving resistance and a first mass estimated value, and
  a second ascertained value corresponding to at least one of a second driving resistance and a second mass estimated value,
the first and second ascertained values being determined at least as a function of the at least one first and second acceleration values and the at least one first and second drive values;

(d) comparing at least the first ascertained value with the second ascertained value to determine the vehicle mass value, wherein the first and second ascertained values are determined as a function of at least one of a first further value representing a vehicle speed and a second further value representing a rotational speed of wheels of the motor vehicle.

9. The method according to claim 1, wherein the motor vehicle is a commercial vehicle.

10. A system for determining a vehicle mass value representing a vehicle mass of a motor vehicle having a drive unit, the system comprising:
  a first determination arrangement determining at least one first acceleration value indicative of a vehicle acceleration at a first time and at least one second acceleration value indicative of the vehicle acceleration at a second time;
  a second determination arrangement determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;
  a third determination arrangement determining at least
    a first ascertained value corresponding to at least one of a first driving resistance and a first mass estimated value, and
    a second ascertained value corresponding to at least one of a second driving resistance and a second mass estimated value;
  a fourth determination arrangement determining a roadway slope as a function of a difference between the first ascertained value and the second ascertained value; and
  a fifth determination arrangement determining the vehicle mass value by comparing the roadway slope to at least one of the first ascertained value and the second ascertained value.

11. A system for determining a vehicle mass value representing a vehicle mass of a motor vehicle having a drive unit, the system comprising:
  a first determination arrangement determining at least one first acceleration value indicative of a vehicle acceleration at a first time and at least one second acceleration value indicative of the vehicle acceleration at a second time;
  a second determination arrangement determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;
  a third determination arrangement determining at least
    a first ascertained value corresponding to at least one of a first driving resistance and a first mass estimated value, and
    a second ascertained value corresponding to at least one of a second driving resistance and a second mass estimated value; and
  a fourth determination arrangement determining the vehicle mass value by comparing at least the first ascertained value with the second ascertained value
  a further arrangement including at least one of:
    an arrangement selecting the first and second times to vary one of the first and second drive values from another one of the first and second drive values in a predetermined manner,
      wherein at least one difference between the first and second drive values exceeds or drops below a predetermined threshold value, and
    an arrangement generating a signal representing a gear ratio of a vehicle transmission,
      wherein the first and second times are selected as a function of the generated signal, and
      wherein varying transmission ratios are present at the first and second times.

12. A system for determining a vehicle mass value representing a vehicle mass of a motor vehicle having a drive unit, the system comprising:
  a first determination arrangement determining at least one first acceleration value indicative of a vehicle acceleration at a first time and at least one second acceleration value indicative of the vehicle acceleration at a second time;

a second determination arrangement determining at least one first drive value and at least one second drive value, the at least one first drive value being indicative of one of a first drive force and a first drive torque of the drive unit at the first time, the at least one second drive value being indicative of one of a second drive force and a second drive torque of the drive unit at the second time;

a third determination arrangement determining at least
   a first ascertained value corresponding to at least one of a first driving resistance and a first mass estimated value, and
   a second ascertained value corresponding to at least one of a second driving resistance and a second mass estimated value; and a fourth determination arrangement determining the vehicle mass value by comparing at least the first ascertained value with the second ascertained value, the fourth determination arrangement determining whether the first and second ascertained values are within a predetermined range.

13. The system according to claim 12, wherein the fourth determination arrangement determines whether at least one difference between the first and second ascertained values exceeds or drops below a predetermined threshold value.

14. The system according to claim 10, wherein the motor vehicle is a commercial vehicle.

* * * * *